(12) United States Patent
Yang et al.

(10) Patent No.: US 8,660,026 B2
(45) Date of Patent: Feb. 25, 2014

(54) METHOD AND APPARATUS FOR PROVIDING MAPPING MANAGEMENT

(75) Inventors: Chen-Yui Yang, Marlboro, NJ (US);
Paritosh Bajpay, Edison, NJ (US);
David H. Lu, Morganville, NJ (US);
Anthony Mark Srdar, Alpharetta, GA (US); Fang Wu, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 395 days.

(21) Appl. No.: 12/973,807

(22) Filed: Dec. 20, 2010

(65) Prior Publication Data
US 2012/0155298 A1    Jun. 21, 2012

(51) Int. Cl.
*H04W 28/16*    (2009.01)
*H04L 1/00*    (2006.01)

(52) U.S. Cl.
USPC ............................................. 370/252

(58) Field of Classification Search
USPC ............................................. 370/252
See application file for complete search history.

(56) References Cited

U.S. PATENT DOCUMENTS

| | | | |
|---|---|---|---|
| 6,738,637 B1 * | 5/2004 | Marinho et al. | 455/512 |
| 2009/0103491 A1 * | 4/2009 | Zuniga et al. | 370/331 |
| 2010/0008291 A1 * | 1/2010 | LeBlanc et al. | 370/328 |
| 2010/0118711 A1 * | 5/2010 | Cankaya et al. | 370/248 |
| 2010/0149971 A1 * | 6/2010 | Noriega | 370/230 |
| 2010/0191846 A1 * | 7/2010 | Raleigh | 709/224 |
| 2011/0069685 A1 * | 3/2011 | Tofighbakhsh | 370/338 |
| 2011/0158184 A1 * | 6/2011 | Agulnik et al. | 370/329 |
| 2011/0194535 A1 * | 8/2011 | Johansson et al. | 370/331 |
| 2011/0242980 A1 * | 10/2011 | Bader | 370/235 |
| 2012/0092992 A1 * | 4/2012 | Pappas et al. | 370/235 |
| 2012/0120831 A1 * | 5/2012 | Gonsa et al. | 370/252 |

* cited by examiner

*Primary Examiner* — Derrick Ferris
*Assistant Examiner* — Faisal Choudhury (57) ABSTRACT

A method, computer readable medium and apparatus for performing mapping management are disclosed. For example, the method monitors network performance measurements of long term evolution mobility elements, monitors a class type and a bandwidth type of long term evolution interfaces, determines if an impairment state is detected based upon the monitoring network performance measurements and the monitoring the class type and the bandwidth type, determines if the impairment state is due to a class of service and a quality of service mismatch and reconfigures the quality of service if the impairment state is due to the class of service and the quality of service mismatch.

19 Claims, 8 Drawing Sheets

| | Mobility - LTE service examples 310 | QCI 314 | DiffServ DSCP (Decimal) 316 | Opt E-MAN PCP/VLAN (P bits) 318 | MEF UNI Class / PCN (3 Classes Supported) 320 | MEF COS Label (2 Classes Supported) 322 | CBB EXP 324 | EXP queue 326 | AVPN COS 328 |
|---|---|---|---|---|---|---|---|---|---|
| 330 | Conversational Voice (GBR) | 1 | EF (46) | 5 | High / 5 | H | 5 | rt | COS1 |
| 332 | Conversational Video (GBR) | 2 | AF41 (34) | 4 | High / 5 | H | 4 | Private (vpn) | COS2v |
| 334 | Real Time Gaming (GBR) | 3 | CS5 (40) | 5 | High / 5 | H | 5 | rt | COS1 |
| 336 | MM Streaming (GBR) | 4 | AF31 (26) | 3 | Medium / 3 | L | 4 | Private (vpn) | COS2 |
| 338 | IMS Signaling | 5 | CS4 (32) | 4 | High / 5 | H | 4 | Private (vpn) | COS2v |
| 340 | TCP, ftp, apps High priority | 6 | AF32 (28) | 3 | Medium / 3 | L | 4 | Private (vpn) | COS2 |
| 342 | VoIP, video type apps - non GBR | 7 | AF21 (18) | 2 | Medium / 3 | L | 3 | Private (vpn) | COS2 |
| 344 | TCP, ftp, apps Reg. priority | 8 | AF22 (20) | 2 | Medium / 3 | L | 2 | mis | COS3 |
| 346 | TCP, ftp, apps Low priority | 9 | CS0 (0) | 0 | Low / 1 | L | 1 | mis | COS4 |

METHOD AND APPARATUS FOR PROVIDING MAPPING MANAGEMENT

BACKGROUND

The third generation partnership project (3GPP) long term evolution (LIE) represents a major advance in cellular technology. LTE is designed to meet carrier needs for high-speed data and media transport as well as high-capacity voice support well into the next decade. LTE is well positioned to meet the requirements of next-generation mobile networks. It will enable operators to offer high performance, mass-market mobile broadband services, through a combination of high bit-rates and system throughput (in both the uplink and downlink) with low latency.

Today, providing LTE services requires the deployment of high performance network equipment in complex networks. Equipment failures and performance degradation should be detected and addressed promptly. Thus, the desire to offer reliable and predictable performance and to meet quality of service (QoS) requirements to support voice, video and data may require frequent interventions by a network engineer or a technician in today's networks.

SUMMARY

In one embodiment, the present disclosure teaches a method, computer readable medium and apparatus for performing mapping management. In one embodiment, the method monitors network performance measurements of long term evolution mobility elements, monitors a class type and a bandwidth type of long term evolution interfaces, determines if an impairment state is detected based upon the monitoring network performance measurements and the monitoring the class type and the bandwidth type, determines if the impairment state is due to a class of service and a quality of service mismatch and reconfigures the quality of service if the impairment state is due to the class of service and the quality of service mismatch.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
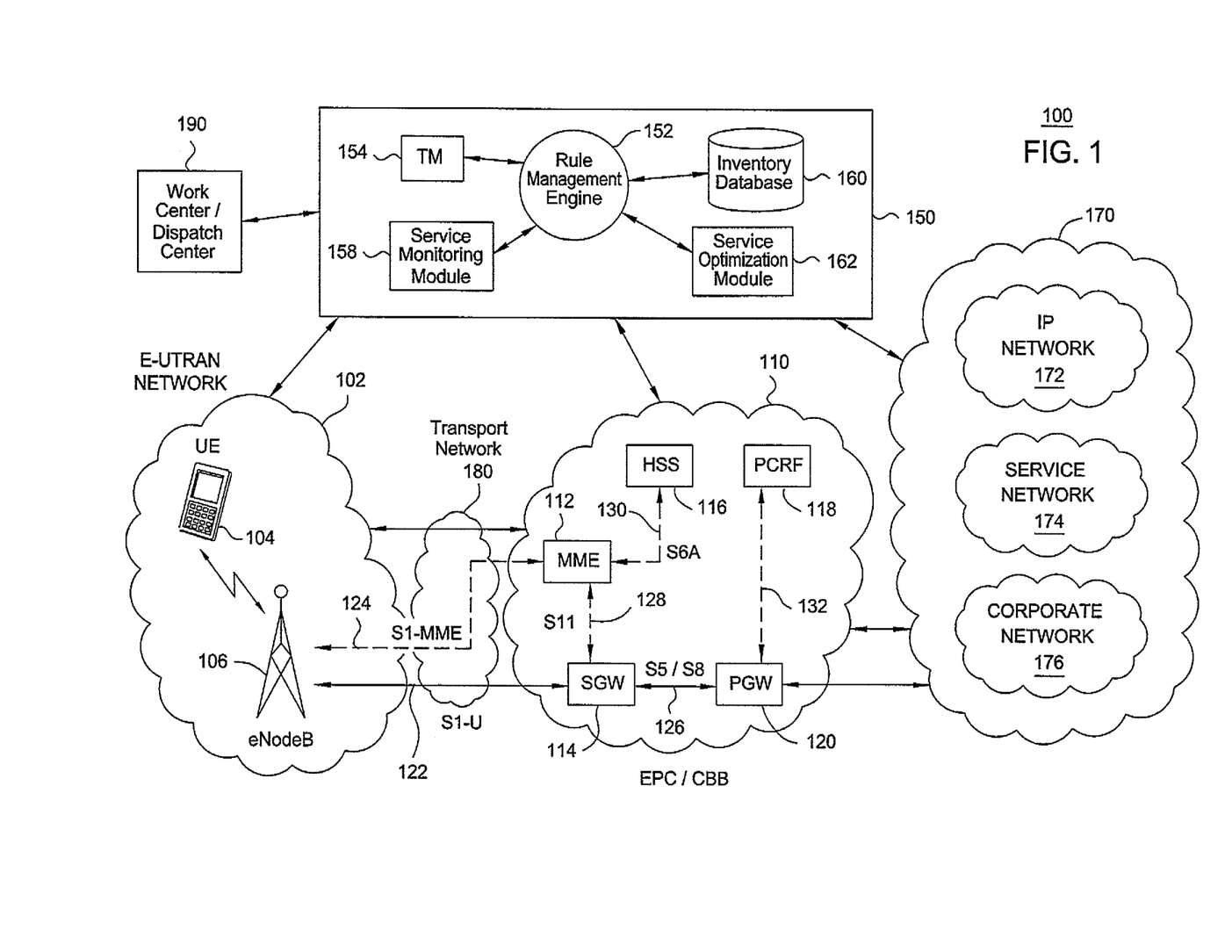
FIG. 1 illustrates one example of a long term evolution evolved packet system network architecture which is monitored by a management structure.

The present disclosure broadly discloses a method, computer readable medium and an apparatus for performing mapping management in a long term evolution evolved packet system. FIG. 1 is a block diagram depicting one example of a long term evolution (LTE) evolved packet system (EPS) network architecture 100 related to the current disclosure. In one embodiment, the LTE EPS network architecture 100 includes an LTE evolved universal terrestrial radio access network (E-UTRAN) network 102, a transport network 180, an evolved packet core (EPC) or common backbone (CBB) 110, a rule management system 150 and peer entities 170.

Broadly, the LTE E-UTRAN network 102 includes user equipment (UE) 104 and a base station 106. In one embodiment, the base station 106 may be an eNodeB. The UE 104 may communicate with the base station 106 over the air and wirelessly.

In one embodiment, the transport network 180 may be a backhaul network. More specifically, the transport network 180 may be a backhaul via optical Ethernet network. The transport network 180 may be connected via one or more smart integrated access devices (SIADs) and multi-service nodes (MSNs) to the LTE E-UTRAN network 102 and the EPC/CBB 110.

In one embodiment, the EPC/CBB 110 includes a mobile management entity (MME) 112, a serving gateway (SGW) 114, a home subscriber server (HSS) 116, a policy and charging rules function (PCRF) 118 and a packet data network (PDN) gateway (PGW) 120. In one embodiment, the MME 112 performs all of the control signaling between various equipment and devices in the LTE E-UTRAN network 102 and the EPC/CBB 110.

The SGW 114 routes and forwards user data packets. When the UE 104 is idle, the SGW 114 terminates the downlink data path and triggers paging when data arrives for the UE 104.

The HSS 116 manages subscription-related information for a user of the UE 104. For example, the HSS 116 stores information such as authorization of the user, security requirements for the user, quality of service (QoS) requirements for the user, etc. For example, the MME 112 may communicate with the HSS 116 to determine if the UE 104 is even authorized to establish a call before the call is established.

The QoS control at a service level is achieved via the PCRF 118 to derive the authorized QoS values from the QoS subscription information together with policy rules based on service type, subscriber type, or predefined PCRF internal policies, and to associate the authorized QoS values to the EPS data bearer through the bearer binding of PCRF 118 within the PGW 120. The PGW 120 provides connectivity from the UE 104 to the peer entities 170.

The LTE E-UTRAN network 102 and EPC/CBB 110 include various data bearer paths represented by solid lines 122 and 126. Some of the data bearer paths may be referred to by a specific label. For example, line 122 may be considered an S1-U bearer and line 126 may be considered an S5/S8 bearer. In addition, the EPC/CBB 110 includes various signaling bearer paths represented by dashed lines 124, 128, 130 and 132. Some of the signaling bearer paths may be referred to by a specific label. For example, line 124 may be considered an S1-MME signaling bearer, line 128 may be considered an S11 signaling bearer and line 130 may be considered an S6a signaling bearer. The above data bearer paths and signaling bearer paths are only illustrated as examples and it should be noted that additional data bearer paths and signaling bearer paths may exist that are not illustrated or labeled.

It should be noted that the LTE E-UTRAN network 102 and the EPC/CBB 110 are illustrated in a simplified block diagram in FIG. 1. In other words, the LTE E-UTRAN network 102 and the EPC/CBB 110 may include additional network elements that are not shown such as various routers, switches and controllers. In addition, although FIG. 1 illustrates only a single one of each of the various types of network elements, it should be noted that the LTE E-UTRAN network 102 and the EPC/CBB 110 may include any number of the various network elements. For example, the EPC/CBB 110 may include a pool (i.e., more than one) of MMEs 112, SGWs 114 or PGWs 120.

The peer entities 170 may include external networks. For example, the peer entities may include trusted and non-trusted external networks such as an internet protocol (IP) network 172, a service network 174, a corporate network 176 and the like.

Figure 2:
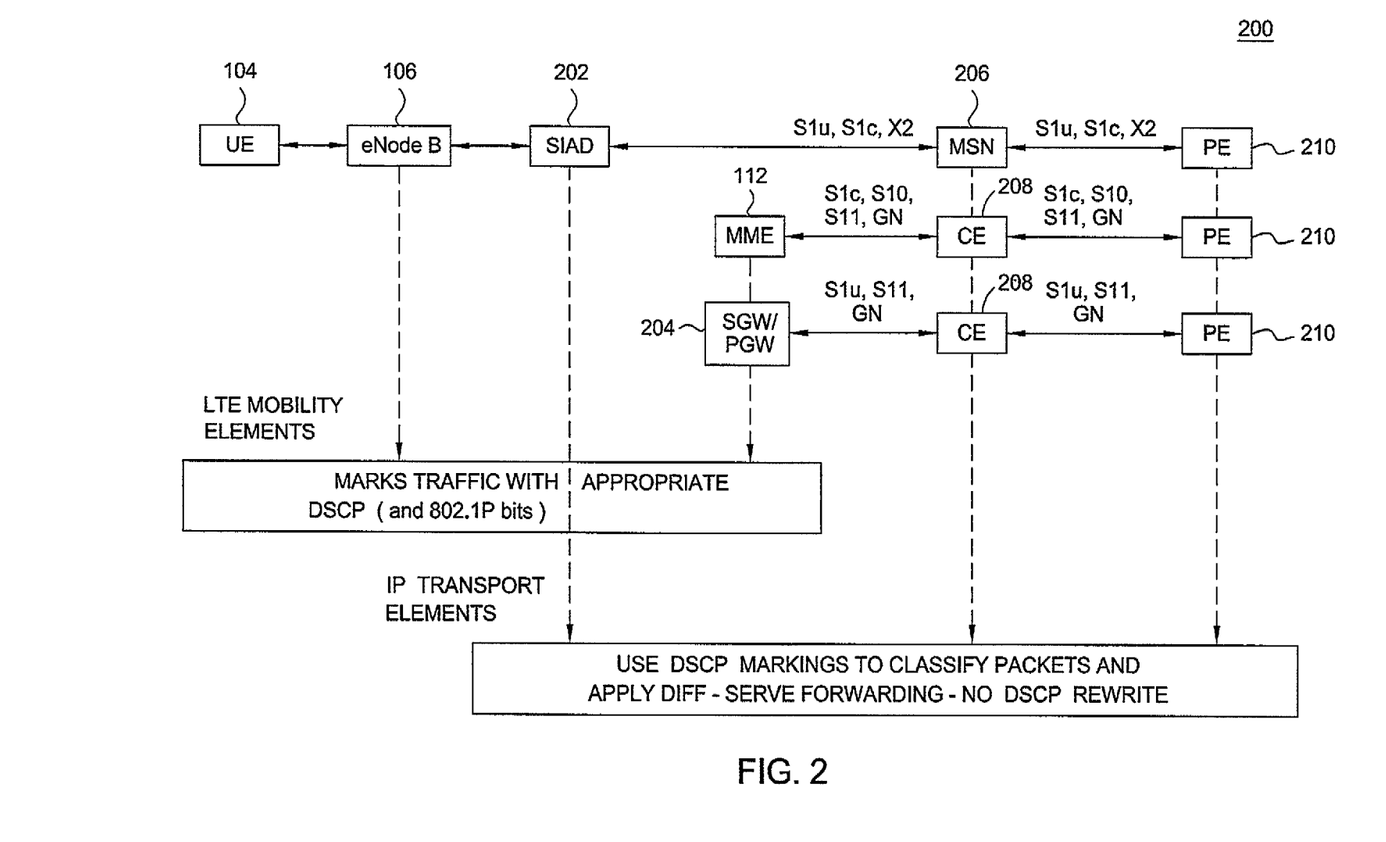
FIG. 2 illustrates one example of an end-to-end long term evolution transport quality of service architecture.

FIG. 2 illustrates one example of an end-to-end LTE transport quality of service (QoS) architecture 200. Where appropriate, the same reference numerals from FIG. 1 are used in FIG. 2. FIG. 2 illustrates the UE 102, the eNodeB 106, a SIAD 202, a MSN 206, the MME 112, a SGW/PGW 204, one or more customer edge routers 208 and one or more provider edge routers 210.

The functions of the UE 102, the eNodeB 106 and the SGW/PGW 204 are discussed above. The SIAD 202 is a device that provides wireless traffic aggregation and backhaul from a cell site to an EPC network 110. The MSN 206 provides layer 2 and layer 3 networking functions for wireless service between one or more SIADs 202 and the EPC network 110.

In the embodiment disclosed by FIG. 2, all LTE traffic (e.g. user and signaling) gets mapped to differential service code points (DSCP) and Ethernet P-bits based on a QoS-Mapping Table. All LTE mobility elements (e.g., elements within the LTE E-UTRAN network 102 and the EPC 110) are responsible to apply appropriate QoS markings. In addition, all internet protocol (IP) mobility transport network elements use QoS markings to prioritize traffic during congestion. They will not write and re-write IP QoS markings. The network elements allow all IP transport elements to consolidate multiple traffic types (with multiple QoS requirements) on a single interface, which leads to increased capacity utilization.

The architecture 200 also supports diff-service QoS functionality. For end-to-end QoS that extends to public and private IP networks (e.g. IP network 172 and corporate network 176), a quality control indicator (QCI) value is mapped to DSCP and to different transport network class of service (CoS)/QoS attributes. For example, there may be an unique DSCP identification per mobility application or service type. For example, 3GPP standards recommend 9 different QCI for user traffic. This is shown by example in FIG. 3 and discussed below.

The architecture 200 also provides transparency between mobility product and service offerings and transport QoS implementations. For example, it can leverage existing IP QoS capability and implementation in the EPC/CBB 110 and for AT&T virtual private network (AVPN) commercial services.

Referring back to FIG. 1, the LTE EPS network architecture 100 also includes a rule management system 150. In one embodiment, the rule management system 150 can be implemented as one or more independent servers or included as part of another application server within the network 100. In one embodiment, the rule management system 150 may be located in the EPC/CBB 110 or external to the EPC/CBB 110. The rule management system 150 is in communication with various devices within the LTE E-UTRAN network 102, the EPC/CBB 110 and the peer entities 170.

In one embodiment, the rule management system 150 includes a rule management engine 152, a ticketing module 154, a service monitoring module 158, a network inventory database 160 and a service optimization module 162. In one embodiment, the various modules in the rule management system 150 may be implemented as a single server or may be implemented as separate servers.

In one embodiment, the ticketing module 154 communicates with a work center or dispatch center 190. The service monitoring module 158 monitors LTE mobility elements, such as for example, eNodeB, MME, SGW/PGW and IP Transport Elements, such as for example, SIAD and MSN over the IP access transport network and CE and PE over the CBB transport network. For example, the service monitoring module 158 collects data on various parameters related to the integrity, accessibility, availability and retainability of the transport network. Accessibility may be defined as a measure (e.g., a probability) that an end user is provided with an EPS bearer when requesting access. Retainability may be defined as a measure (e.g., a probability) that an end user is able to continually retain an established bearer (i.e., without abnormally losing an established EPS bearer) during the time the established bearer is used or needed. Integrity may be defined as a measure (e.g., a measure of delay, loss packets, and the like) as to how the LTE E-UTRAN network 102 impacts the service quality provided to an end user. Utilization may be defined as a measure of the ability to meet and measure traffic and traffic demand of given characteristics. Data related to these parameters may be used to determine a class of service (CoS) for a particular service, a particular session of a particular service, or a particular customer.

For example, different classes of service (CoSs) can be defined as a "low" class, a "medium" class, or a "high" class. Alternatively, the different classes of CoSs can be defined using numeric values, e.g., using a numeric range of 1-10 or 1-5, with the values "10" and "5", representative of the highest class value, respectively. The CoS is a parameter that can be associated with different type of services being provided by the network. For example, a predefined CoS can be associated with a predefined set of network resources or performance characteristics, e.g., routes that can be used (dedicated routes versus shared routes), network elements that can be used, network performances characteristics that are acceptable or not acceptable (e.g., the level of packet delays, packet loss, jitter, and the like).

It should be noted that the CoSs can be dynamically altered based upon network conditions, day of the week, time of day and so on. For example, an interactive gaming service may be provided with a CoS of "medium" during normal business hours, e.g., 8:00 am-5:00 pm. However, the CoS may be altered to "high" during the time period of 8:00 pm-1:00 am, where there is less "business related" network traffic, while there is an increase in "entertainment-related" traffic. This allows a network service provider to seamlessly and efficiently allocate valuable network resources.

Furthermore, the CoS can be predefined in accordance with the retainability measure, the integrity measure, the utilization measure and the availability measure as discussed above. For example, each CoS can be predefined to support a certain level of retainability, integrity, utilization and/or availability.

In one embodiment, the service monitoring module 158 also monitors a quality of service (QoS) being provided to a customer. For example, the service monitoring module 158 determines the QoS provided to a customer that spans from the LTE E-UTRAN network 102 to the peer entities 170. In one embodiment, the QoS is monitored on a per service based and on a per bearer base (i.e. was the service on a guaranteed or non-guaranteed bandwidth).

The QoS can be determined based upon a quality of service class identifier (QCI) per service that is measured. The QCI is directly correlated to the QoS. The QCI may be determined by collecting data related to parameters such as packet delay, call setup delay, packet error loss rate, jitter and the like. Based upon the data, the QCI can be determined and in turn, the QCI is used to determine the QoS. Thus, QCI allows the present method to quickly correlate a service performance with a particular quality of service. Furthermore, as a variety of services is continually being offered by a service provider, the QCI allows the service provider to carefully select a quality of service that the service provider is willing to guarantee. In other words, the granularity in using a range of QCIs allows the service provider to match different services with different QoSs. In one embodiment, the service monitoring module 158 may monitor the LTE mobility elements and all LTE interfaces to collect the above data illustrated in FIG. 2. In one embodiment, all alarms and performance measurements are sent through an operations, administration and maintenance (OAM) network from network devices to an elementary management system (EMS) and are collected by the service monitoring module 158.

In one embodiment, the network inventory database 160 includes an updated topology view of all equipment or network elements within the LTE EPS network architecture 100. In addition, the network inventory database 160 stores one or more predefined tables, e.g., table 300 illustrated by FIG. 3 that correlates a QoS and a CoS for a particular service. The predefined table 300 is discussed in further detail below.

With respect to the concepts of QoS and CoS discussed above, each demarcation point within the network architecture 100 may perform a mapping of QoS and CoS. For example, a mapping may occur between the UE 104 and the base station 106, between the base station 106 and the transport network 180, between the transport network 180 and the EPC/CBB 110 and between the EPC/CBB 110 and the peer entities 170.

Thus, in one embodiment, the service monitoring module 158 may monitor the QoS and CoS at various points or bearer paths within the network architecture 100 to identify various bottlenecks or congestion points where a QoS and/or CoS miss-mapping may be occurring. QoS and CoS mapping may be used to alleviate congestion or bottlenecks due to various scenarios such as, for example, a speed mismatch, aggregation or confluence.

Figure 4:
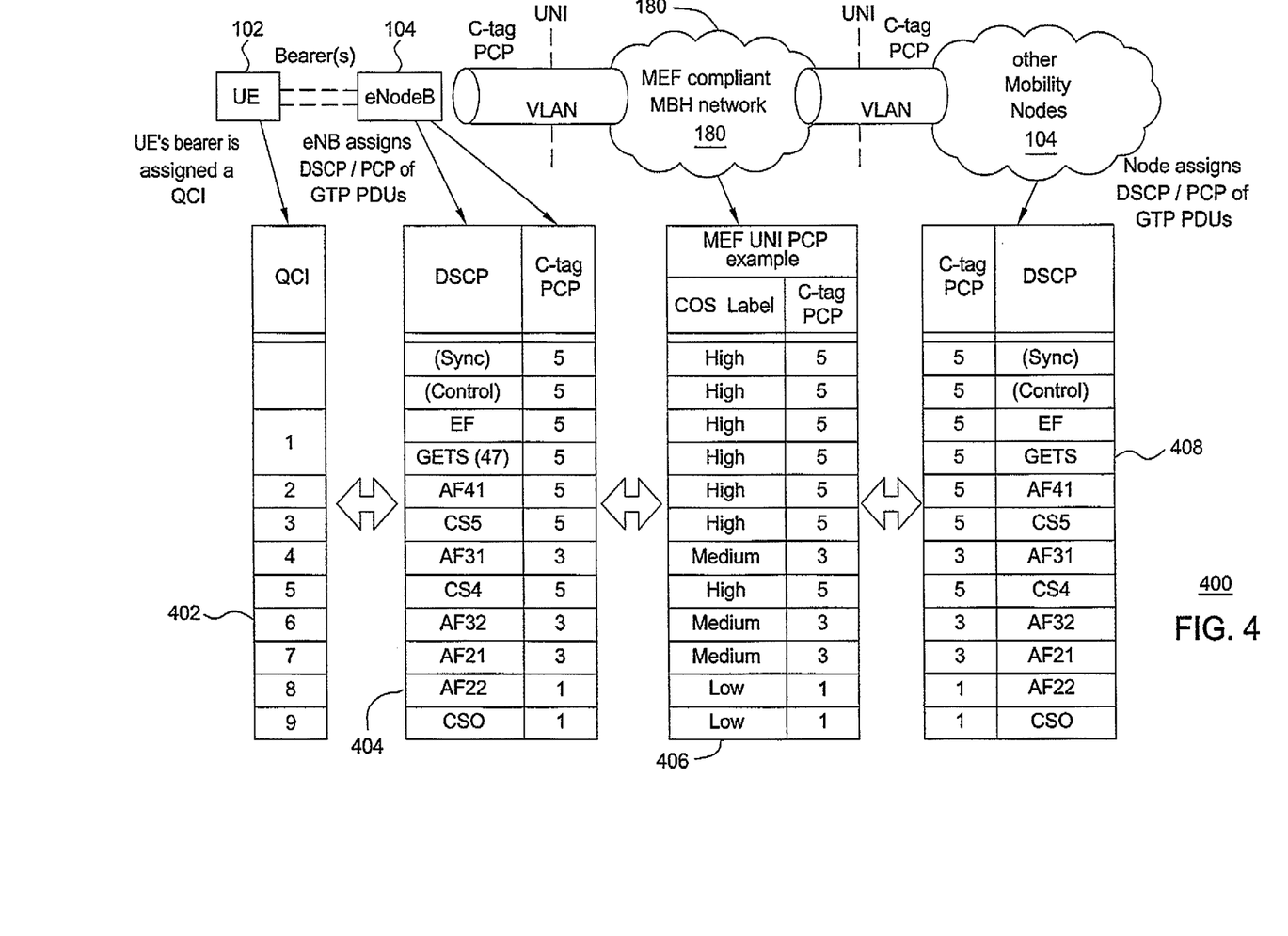
FIG. 4 illustrates one embodiment of mapping related to each portion of the network.

In one embodiment, an example of the mapping between each demarcation point is provided by example in FIG. 4. FIG. 4 shows the assignment of DSCP values to packets of the general packet radio services (GPRS) tunneling protocol (GTP) tunnels between the eNodeB and PGW. These apply to the LTE nodes, and also to the IP Transport nodes. For example, a UE's bearer is assigned a QCI shown in table 402. This QCI may be mapped to a DSCP and C-tag primary code point (PCP) assigned by the eNodeB of GTP protocol data units (PDUs) as shown in table 304. The C-tag PCP may then be mapped to a CoS label in the transport network 180 as shown by table 406, which may then be further mapped to a DSCP at other mobility nodes 104 as shown by table 408.

Table 1 below identifies QoS mapping for all mobility signaling traffic, infrastructure control traffic and OAM traffic.

TABLE 1

LTE CONTROL AND MANAGEMENT PLANE
TRAFFIC END-TO-END QOS MAPPING

| Traffic Type | DSCP | Mobility Class | 802.1P Bits | CBB Class | EXP |
|---|---|---|---|---|---|
| LTE S1c (eNode B - MME) | CS5 | COS1 | 5 | Real Time | 5 |
| LTE S11 (SGW - MME) | CS5 | COS1 | 5 | Real Time | 5 |
| LTE S10 (MME - MME) | CS5 | COS1 | 5 | Real Time | 5 |
| LTE S5 (SGW - PGW) | CS5 | COS1 | 5 | Real Time | 5 |
| LTE S6a (MME - HSS) | CS5 | COS1 | 5 | Real Time | 5 |
| LTE Gx (PGW - PCRF) | CS5 | COS1 | 5 | Real Time | 5 |
| OAM Priority | CS6 | CONTROL | 6 | VPN | 4 |
| OAM Bulk | CS0 | Default | 0 | MIS | 1 |
| Network Control | CS6 | CONTROL | 6 | Control | 6 |

As transport between LTE mobility network elements moves towards "all IP", utilizing IP type of service (TOS) byte for QoS classification should be implemented. Typically, mobility network elements in the LTE E-UTRAN network 102 and the EPC/CBB 110 E-UTRAN and EPC network elements support DSCP mapping for user and signaling traffic. They provide a default QCI-DSCP mapping and also the option of user configurable mapping. Since CBB has an existing DSCP-based classification structure for commercial services it will include the same classification structure for mobility IP transport.

Mobility transport class characteristics include CoS1 to CoS4 and a control class. For example CoS1 relates to real-time traffic. Real-time traffic such as voice or video traffic requires low latency due to the time sensitive nature of the application (some kind of codec). In addition to the low latency requirement, the traffic has a jitter parameter that calls for careful engineering of the applications on the link. The total amount of resources allocated to CoS1 is capped. It cannot burst and take away bandwidth from other classes. Unused bandwidth in CoS1 is available to CoS2-CoS4 for use.

It should be noted that typically, CoS1 traffic with strict priority queuing tend to starve other classes during heavy congestion, and a hard policing is employed on CoS1 class to avoid bandwidth starvation. In the case of mobility, it is not desirable to drop real-time class traffic which includes critical infrastructure traffic like signaling between mobility network elements.

CoS2 includes two classes CoS2 and CoS2V. CoS2V includes lower latency traffic. Due to the hardware support on all the platforms this cannot be enforced in the same manner as COS1. Low Latency is achieved through careful engineering of the allocated bandwidth and preventing queue depth growth. If this class experiences congestion due to customer applications transmitting more than the allotted bandwidth, neither low-latency delay nor jitter will be controlled. This class is used to supply the customer with another bandwidth allocation used to engineer their applications. It is not a hardware supported real time class with both latency and jitter guarantees. By default this class has an ingress policer and output shaping enabled, making it behave as close to COS1 as possible with the hardware support present on the delivery platforms.

CoS2 includes bursty high data. For example, CoS2 includes data traffic that needs network resources allocated to it to insure timely performance. The applications can be client-server applications or transactions where response time is at a premium. Traffic that is part of this class does not compete with data traffic from other classes as long as the total bandwidth consumed by this class does not exceed its' allocation. Once this class exceeds its' allocation, applications in this class will suffer performance degradation. Unused bandwidth in CoS2 is available to the other bursty data classes (CoS3 and CoS4) for use. The queue that supports CoS2 is a first in first out (FIFO) queue.

CoS3 includes bursty low data. CoS3 behaves the same as CoS2.

CoS4 includes best effort data. While scheduled in the same manner as CoS2 and CoS3, the CoS4 queue is implemented with a default mechanism that provides queuing for all unmatched and unspecified CoS traffic. It is expected that this class will handle the bulk of the traffic, but be under allocated resources so that the applications in CoS2 and CoS3 can be given better performance than the applications in CoS4.

It should be noted that the data classes do not have a sense of relative priority. The data classes are scheduled on a weighted basis, each being allocated bandwidth resources. There is no preemption by one data class over another at any time. This means that a packet that is sitting in the CoS3 class, once that class has accumulated enough "tokens" in a class scheduler, it will be transmitted before a packet in the CoS2V queue if the CoS2V queue has exhausted its allocation at that particular time. Depending on platform capability, scheduling priority could be applied across classes.

The control class may be a dedicated class with a small amount of bandwidth that is reserved for all infrastructure control traffic. This class typically enjoys higher scheduling priority over other non-real-time classes. Depending on vendor implementation, locally sourced control traffic (e.g. border gateway protocol (BGP), open shortest path first (OSPF)) are placed on this queue.

In one embodiment, egress class of service is a critical component of end-to-end transport QoS design. This influences QoS requirements including latency, jitter and drop performances. Egress CoS includes scheduler design, bandwidth profile, priority queuing, buffer sizing, drop thresholds, and QoS marking/remarking design.

A standard 5-class (plus control class) scheduler design is recommended for mobility transport. User and signaling traffic are classified into 5 forwarding classes, depending on its DSCP marking. Real Time or CoS1 class is configured for strict-priority scheduling. Remaining classes are scheduled in weighted round robin fashion. Each data class is assigned a bandwidth profile which effectively influences its relative weight in scheduling decision. Unused bandwidth from any class gets shared among remaining classes in proportion to their relative weights.

As an example, the egress scheduler profile may be 80:5: 50:25:15:5, where 80 indicates 80% max bandwidth the policer would allow for CoS1 traffic. The remaining 20% bandwidth is distributed among control (5%), CoS2v (50%), CoS2 (25%), CoS3 (15%), and CoS4 or default (5%) class. The total remaining bandwidth is 100%. The bandwidth distribution here reflects the relative scheduling priority. It has no correlation with actual traffic distribution. It should be noted that the schedule profile can be dynamically altered based upon network traffic conditions.

Referring back to FIG. 1, in one embodiment, the service optimization module 162 performs or communicates instructions to one or more network elements in the LTE EPS network architecture 100 for service optimization based upon the monitored data and the analysis performed by the rule management engine 152. For example, if a QoS policy for a particular LTE service type needs to be changed at the PCRF 118, the service optimization module 162 may instruct the PCRF 110 to implement a new policy. In another example, if a QoS needs to be reconfigured, the optimization module 162 may initiate a QoS reconfiguration, such as resetting or changing a QoS for a particular port.

Figure 3:
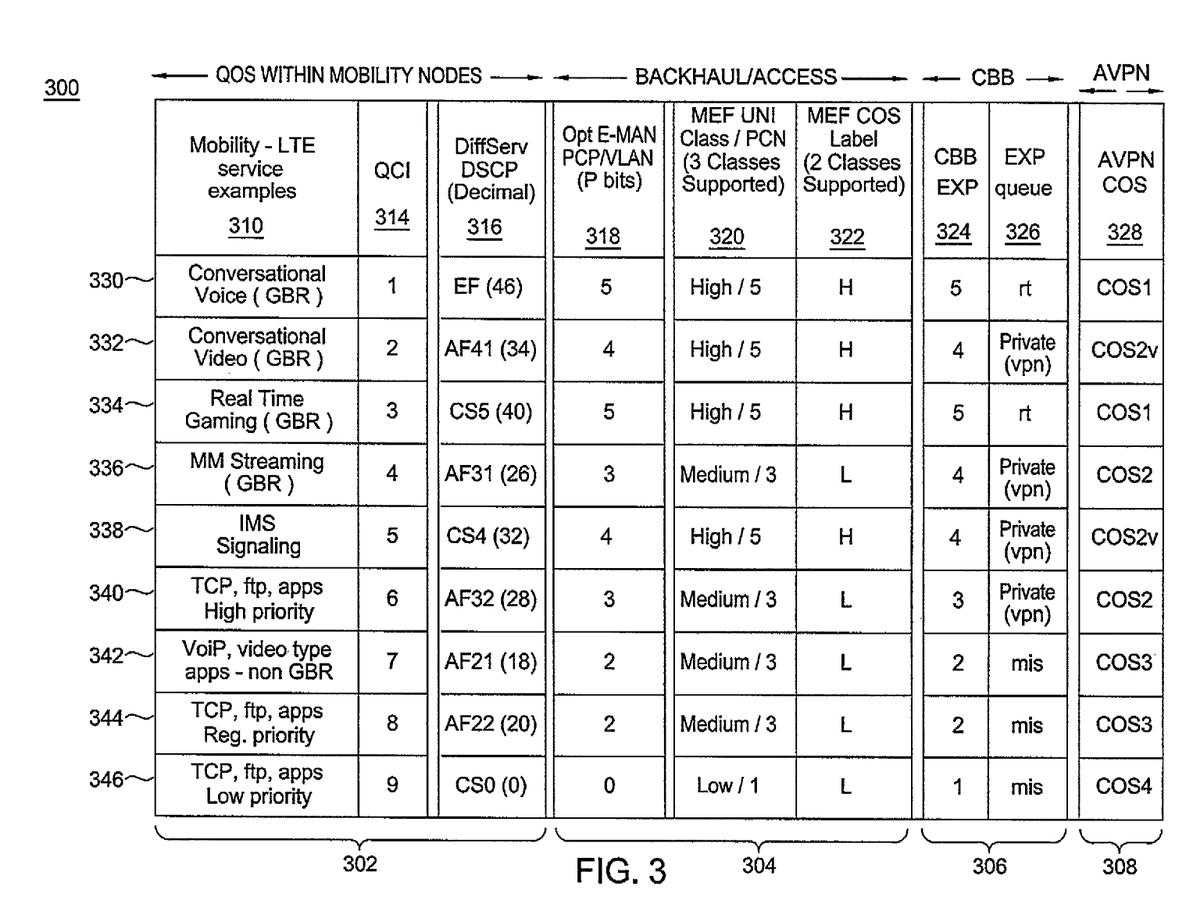
FIG. 3 illustrates one example of a predefined quality of service/class of service table.

In one embodiment, the rule management engine 152 is used to analyze the QoS determined by the data collected by the service monitoring module 158 and the predefined table 300 stored in the network inventory database 160. For example, for a particular service associated with a determined QoS and a determined CoS, the rule management engine 152 finds on the predefined table 300 what the required QoS and the required CoS are supposed to be for that particular service. If the determined QoS and the determined CoS match the required QoS and the required CoS for the particular service on the predefined table 200, then the rule management engine 152 determines that there is no problem. However, if the determined QoS and the determined CoS do not match the required QoS and the required CoS for the particular service on the predefined table 300, the rule management engine 152 may also initiate a reconfiguration of QoS via the optimization module 162.

Referring back to FIG. 3, FIG. 3 illustrates one example of a predefined quality of service/class of service table 300. The predefined table 300 may include a QoS within mobility nodes portion 302, a backhaul/access portion 304, a CBB portion 306 and an AVPN portion 308. The QoS within mobility nodes portion 302 may be considered an evaluation of an end-to-end service (e.g., from the LTE E-UTRAN network 102 to the peer entities 170) provided to the customer. The backhaul/access portion 304 may be considered an evaluation of the performance of the transport network 170. The CBB portion 306 may be considered an evaluation of the performance of the EPC/CBB 110. The AVPN portion 308 may be considered an evaluation of the performance of the peer entities 170 portion of the network architecture 100.

In one embodiment, the QoS within mobility nodes portion 302 may include columns such as service type 310, QCI 314 and DSCP 316. The backhaul/access portion 304 may include columns such priority code point (PCP)/virtual local area network (VLAN) (Pbits) 318, PCP Class 320 and CoS label 322. The PCP is a 3-bit field which refers to the IEEE 802.1p priority. It indicates the priority level. Values are from 0 (best effort) to 7 (highest). A value of 1 represents the lowest priority. These values can be used to prioritize different classes of traffic (e.g., voice, video, data, etc.).

The Ethernet PCP values will support two functions. First, the indication of class (i.e. priority) and the indication of discard eligibility (also known as "color"). A discard eligibility indicator (DEI) bit may be defined or Ethernet, which when used allows the PCP field to only be used to indicate class. The DEI bit should be supported by Ethernet equipment in the target architecture, which will allow all 8 PCP values to be used for priority indication only.

The CBB portion 306 may include columns such as CBB Experimental Bits (EXP) 324 and EXP queue 326. The AVPN portion 308 may include columns such as AVPN CoS 328.

In one embodiment, The DSCP column 316 provides the machine language between network elements such that the QoS may be correlated to a particular CoS. For example, the values of the DSCP column 316 may be associated with a particular AVPN class in column 328 that in turn can be associated with a particular CoS.

Figure 5:
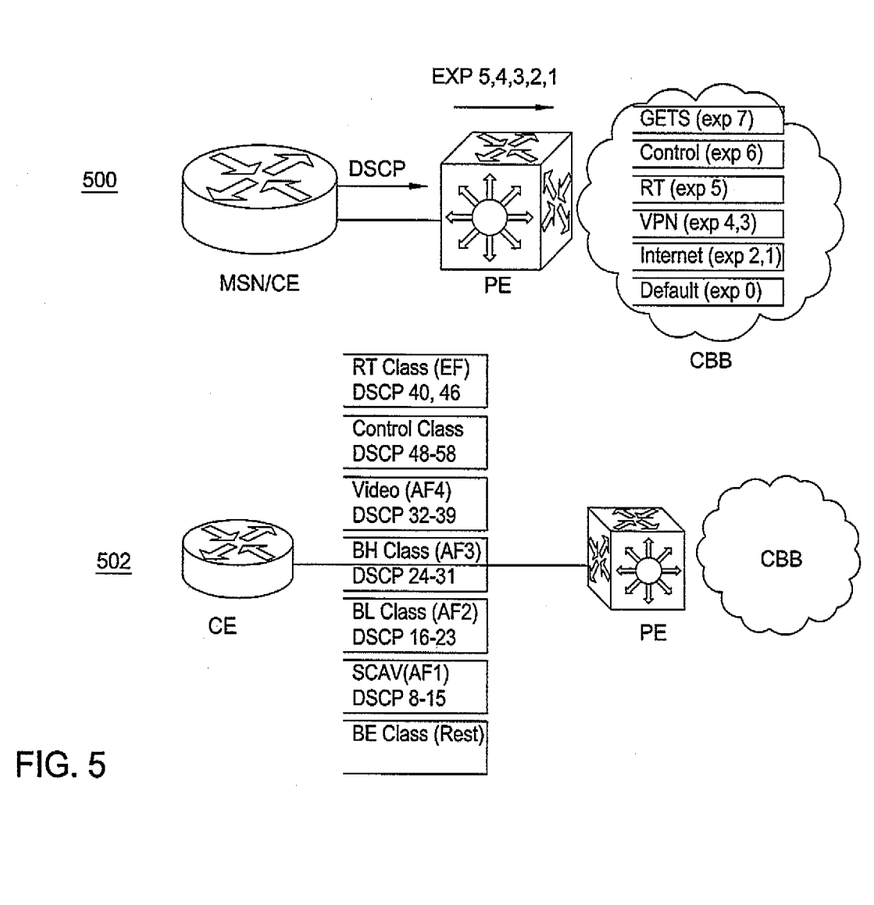
FIG. 5 illustrates two examples of how DSCP values are used by network elements in a CBB network.

FIG. 5 illustrates two examples 500 and 502 of how the DSCP column 316 is used by various network elements to communicate. In example 500 the values of the DSCP column 316 are used between an MSN/CE and a PE in communication with a CBB. For example, the PCP/VLAN (Pbits) 318 may be associated with specific values between 1-5. As a result, the network elements may correlate a DSCP value to a particular service type and CoS in the CBB. Another example is illustrated in example 502.

Tables 2 and 3 below help to illustrate that all mobility user and signaling traffic gets classified on an ingress PE and marked CBB "EXP" before it is forwarded to the core. Depending on an application priority (e.g. DSCP), LTE and UMTS traffic gets placed on a real-time, a VPN or an internet class. The current QoS implementation on PE and MIPE uplink is ready to support recommended queuing design. Only the CE facing the interface QoS implantation shall be updated to support the same. Tables 2 and 3 are provided below:

TABLE 2

CBB CLASS OF SERVICE MAPPING

| QCI | DSCP | AVPN Class | CBB Class | CBB EXP |
|---|---|---|---|---|
| 1 | 46 (EF) | COS1 | Real Time | 5 |
| 2 | 34 (AF41) | COS2v | VPN | 4 |
| 3 | 40 (CS5) | COS1 | Real Time | 5 |
| 4 | 26 (AF31) | COS2 | VPN | 4 |
| 5 | 32 (CS4) | COS2v | VPN | 4 |
| 6 | 28 (AF32) | COS2 | VPN | 3 |
| 7 | 18 (AF21) | COS3 | Internet | 2 |
| 8 | 20 (AF22) | COS3 | Internet | 2 |
| 9 | 0 (CS0) | COS4 | Internet | 1 |

TABLE 3

CLASS OF SERVICE PROFILE

| Class & Bandwidth/ Traffic Type | COS1 80% | Control 5% BWR | COS2V 50% BWR | COS2 25% BWR | COS3 15% BWR | COS4 5% BWR |
|---|---|---|---|---|---|---|
| Network Control (OSPF, BFD) | | X | | | | |
| LTE S1u | X | | X | X | X | X |
| LTE S1c | X | | | | | |
| LTE S5 | X | | X | X | X | X |
| LTE S6a | X | | | | | |
| LTE S10 | X | | | | | |
| LTE S11 | X | | | | | |
| LTE Gx | X | | | | | |
| Gn (GTP-U) | X | | X | X | X | X |
| Gn (GTP-C) | X | | | | | |

It should be noted that an "X" indicate that packets are expected to match the class for a specific type of traffic in Table 3. In Table 3, BFD stands for Bi-directional Forwarding Detection, which provides a single, standardized method of link/device/protocol failure detection at any protocol layer and over any media.

Referring back to FIG. 3, the predefined table 300 may include rows 330-346. It should be noted that the predefined table 300 is only one example and that the number of columns and rows may include any number of columns and rows depending on the amount of information that is desired or needed.

In one embodiment, table 300 describes the QoS mapping for all mobility user plane applications traffic where each QCI identifies a specific mobility application type within unique RAN QoS requirements. The primary goal is to map each QCI to a unique DSCP. Multiple DSCPs are grouped to a transport class. Transport QoS classes are chosen identical to what already is implemented in CBB for VPN transport. A 5 class DSCP-based QoS classification and scheduling scheme may be adopted for end-to-end transport.

In one embodiment, the service type 310 provides information on what type of service is being provided such as conversational voice, conversational video, multi-media streaming, various applications and the like. The class of service 312 provides information on a class that the service type belongs to such as conversational, streaming, interactive or background. The QCI 314 provides the quality control indicator for a particular service. As discussed above, the QCI may be obtained based upon values for various parameters such as packet delay, packet error loss rate and the like. To illustrate, if a particular service can tolerate a high packet delay and a high packet error loss, then the service may be assigned a high QCI value (i.e., a low QoS is required). For example, email may be assigned a QCI value of 9. Vice versa, if a particular service cannot tolerate any packet delay or any packet error loss, then the service may be assigned a low QCI value (i.e., a high QoS is required). For example, telephone calls may be assigned a QCI value of 1, where a delay or loss of packet associated with the voice signal will be easily detected by the parties involved in the conversation.

In one embodiment, the PCP Class 320 may include a required CoS for each service type 310. For example, the PCP Class 320 may be divided into high, medium or low, be divided by numbers for example values from 1-5 or both. It should be noted that any type of grading or value system may be used to assign a value to the QoS, the QCI or the CoS.

The table 300 illustrates one embodiment of an assignment of DSCP values to packets of the GPRS tunnel protocol (GTP) tunnels between the eNodeB 106 and the PGW 120. These apply to the 3GPP nodes and also to the transport nodes under mobility management. Other transport nodes may need to consider the DSCP values as well, but may have varying ability to do so.

The following are the guiding principles and constraints assumed in developing these values. Each QCI should have a unique DSCP value assigned to it at the entrance to the 3GPP SAE (EPC) wireline network. This mapping should be the same across the 3GPP bearer nodes in the network so they can have a common understanding of treatment required by a packet. This is in contrast to deciding now to group various subsets of QCIs to having a common DSCP and hence common QoS treatment. More than one value can be assigned to a QCI, when needed. In particular, when the eNodeB 106 knows that a VoIP call with QCI=1 is a Government Emergency Telecommunications Service (GETS) call, assigning a different DSCP allows downstream nodes to understand the difference because transport nodes generally treat such traffic with priority.

Using the predefined table 300, the rule management system 150 may determine whether there is a QoS and CoS mismatch. For example, for a predefined time period, e.g., every 5 minutes, the rule management system 150 monitors a QoS and CoS of a real-time gaming session for a user. Based upon the predefined table 200, the real-time gaming session QoS requires a QCI of at least 3 and a supported CoS of at least high/5 as shown in row 334. However, the rule management system 150 may determine that the QoS has a QCI of only 4 and that the supported CoS is high/5. Therefore, there is a mismatch because the determined QoS having the QCI of 4 does not match the required QCI of 3 in the predefined table.

Notably, only one of the values needs to be mismatched for a mismatch to be declared. For example, there is a mismatch even though the determined supported CoS of high/5 matched the required supported CoS of high/5 in row 334 of the predefined table 300. As a result of the mismatch, the rule management system 150 would initiate a mapping control. One way to view the mismatch is that the network is properly configured to provide the required resources (e.g., as exemplified by the proper selection of the CoS for the real time gaming service). However, due to some root cause, the required QoS cannot be attained even though the CoS is properly set for the service. One possible cause will be mapping in the network. The use of the verification of the measured QoS as compared to a predefined CoS allows a potential mapping situation to be quickly determined, thereby leading to a resolution as quickly as possible, i.e., triggering a remedial action as soon as possible. This approach will address mapping problem in the network in a timely manner to ensure customer satisfaction.

Figure 6:
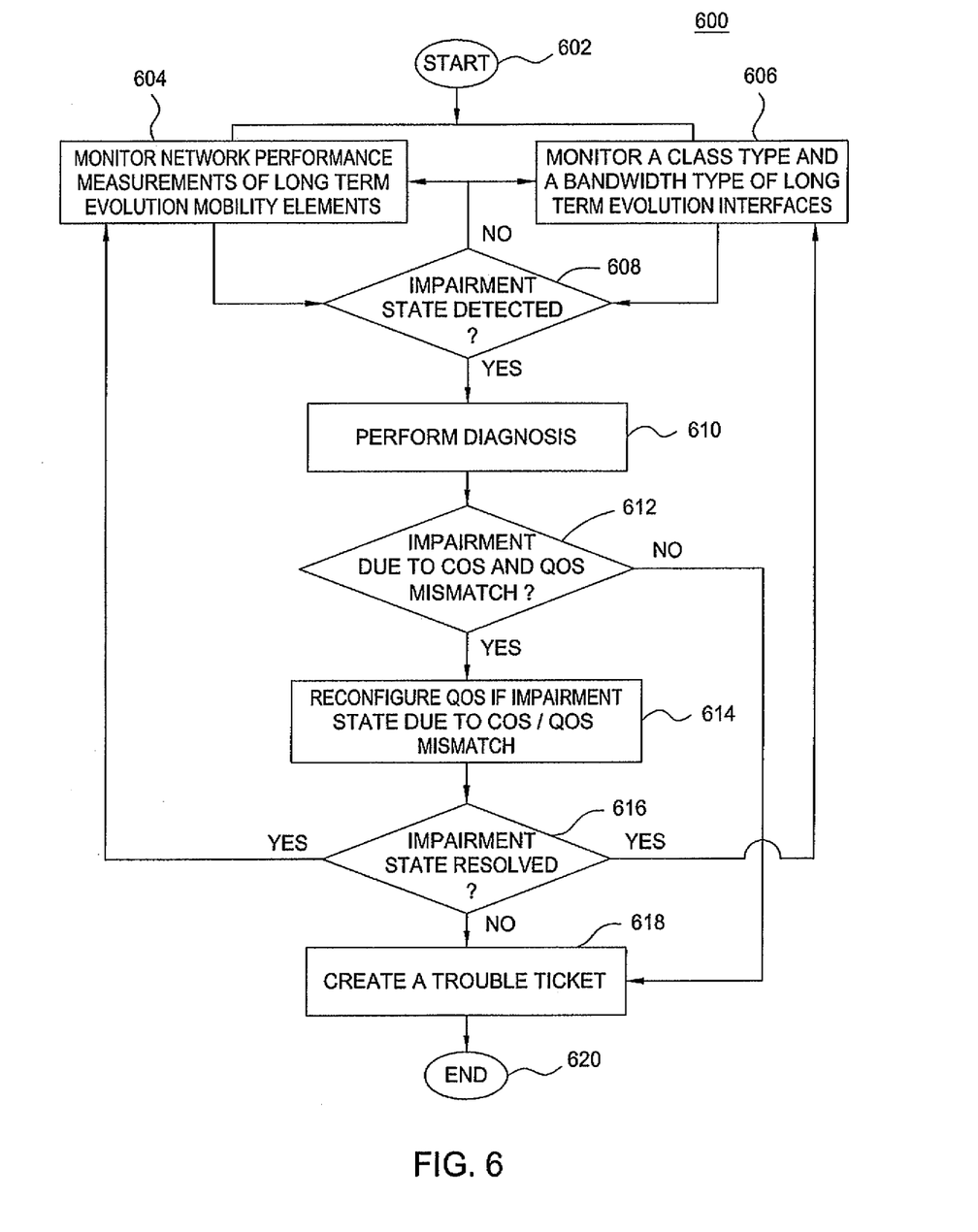
FIG. 6 illustrates a flowchart of a method of QoS/CoS troubleshooting.

FIG. 6 illustrates a flowchart of a method 600 for performing mapping management in the network architecture 100 described above. In one embodiment, the method 600 may be implemented by the rule management system 150 or a general purpose computer having a processor, a memory and input/output devices as discussed below with reference to FIG. 6.

Figure 7:
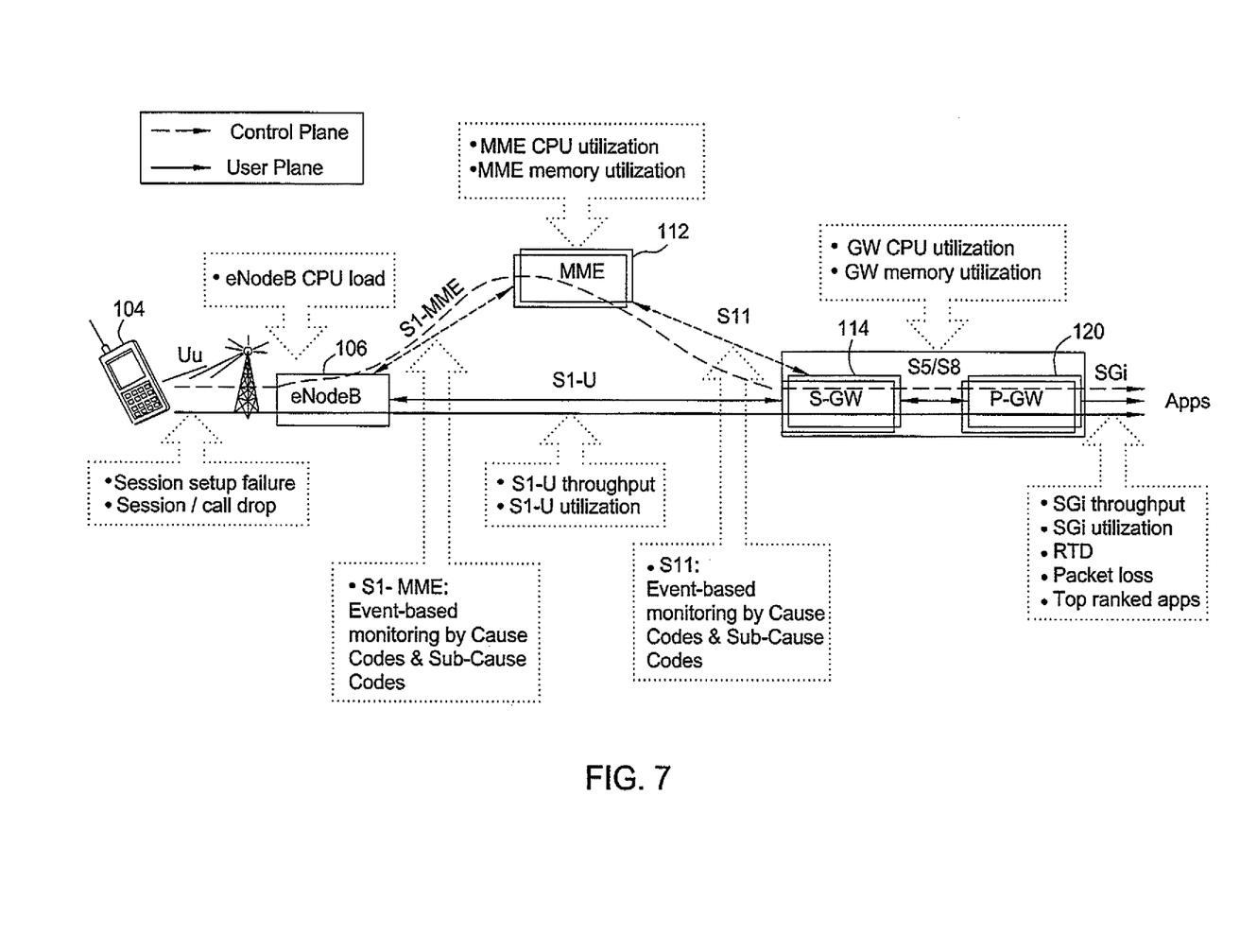
FIG. 7 illustrates one embodiment of end-to-end performance monitoring measurements for locating traffic congestion.

FIG. 7 illustrates one embodiment of end-to-end measurements for locating traffic congestion. The end-to-end throughput is considered "normal" when all key performance indicators (KPIs) on each node and each interface across the network meet the conditions specified in the service level agreement (SLA) requirements. Any KPI along the service path fails to meet the normal condition is considered to be in an "impaired" state. When the "impairment" state is detected, the rule management system 150 will trigger QoS troubleshooting. FIG. 7 may be read in conjunction with FIG. 6 where appropriate.

FIG. 7 illustrates node monitoring and interface monitoring that may be associated with step 604 and 606, discussed below. For example, the monitoring steps can be further defined to include node monitoring for LTE mobility elements such as the eNodeB 106, the MME 112, the SGW 114, the PGW 120 and the IP transport elements such as the SIAD and MSN over IP access transport network and CE and PE over the CBB transport network and interface monitoring for class and bandwidth/traffic type such as LTE S1c (e.g., eNodeB 106-MME 112), LTE S11 (e.g., SGW 114-MME 112), LTE S10 (e.g., MME 112-MME 112), LTE S5 (e.g., SGW 114-PGW 120), LTE S6a (e.g., MME 112-HSS 116) and LTE Gx (e.g., PGW 120-PCRF 118). Throughput degradation or traffic congestion may be determined due to a DSCP mismatch. FIG. 7 illustrates various parameters that may be monitored for each node and interface.

The method 600 begins at step 602 and proceeds to step 604. At step 604, the method 600 monitors network performance measurements of LTE mobility elements. In one embodiment, the network performance measurements of IP transport elements may also be monitored. For example, SGW and PGW may be monitored by the service monitoring module 158 in the EPC/CBB 110 as shown in FIG. 1.

At step 606, the method 600 monitors a class type and a bandwidth type for all interfaces as shown in FIGS. 2 and 7. The monitoring in steps 602 and 604 may be performed by the service monitoring module 158 of the rule management system 150.

At step 608, the method 600 determines if an impairment state is detected. For example, the impairment state may be detected if there is network congestion, throughput degradation or KPIs in the network are not met, as discussed above. If an impairment state is not detected, the method 600 may return to steps 604 and 606 and continue to monitor the mobility elements and the interfaces of the LTE network.

However, if an impairment state is detected, then the method 600 proceeds to step 610. At step 610, the method 600 performs diagnosis of the impairment state. In other words, the method 600 attempts to find a root cause of the impairment state.

At step 612, the method 600 determines if the impairment state is due to a CoS and QoS mismatch. For example, the rule management system 150 uses the predefined table 300 to identify a required QoS (based upon the required QCI) and a required CoS for a particular type of service. Based upon the monitoring steps in step 604 and 606, the rule management system 150 may determine whether the determined CoS from the monitoring step 604 and the determined QoS from the monitoring step 606 match the required CoS and the required QoS (based upon the required QCI) listed in the predefined table 300 for the particular type of service.

In one embodiment, the step 612 may be considered a QoS troubleshooting step. For example, the QoS level per port or per service path may be checked. The QoS levels to check may include a number of unicast/multicast/broadcast packets per QoS (DSCP markings) that are transmitted/received, a number of unicast/multicast/broadcast packets dropped per QoS that are transmitted/received, a number of bytes/octets per QoS that are transmitted/received, a number of bytes/octets that are dropped or discarded per QoS transmitted/received and a percentage of packets that are dropped or discarded per QoS Then a CoS and DSCP mapping for ingress class of service and/or egress class of service may be performed including the scheduler design, bandwidth profile, priority queuing, buffer sizing, drop thresholds and QoS markings/remarking designs.

If the impairment state is not due to a CoS and QoS mismatch (e.g., the impairment state is due to network congestion or throughput degradation) the method 600 proceeds to step 618, where a trouble ticket is generated and reported to the work center 190. However, if the impairment state is due to a CoS and QoS mismatch, the method 600 proceeds to step 614.

At step 614, the method 600 reconfigures the QoS if the impairment state is due to a CoS and QoS mismatch. For example, if the CoS and QoS are mismatched, then the QoS for a particular port may be reconfigured by using a command such as, for example, "set port QoS". Then the proper QoS mapping may be verified.

At step 616, the method 600 determines if the impairment state is resolved. In other words, is there no longer a CoS and QoS mismatch. If there impairment state is resolved, then the method 600 proceeds back to steps 604 and 606 to continue monitoring the mobility elements and the interfaces of the LTE network.

However, if the impairment state is not resolved, then the method 600 proceeds to step 618. At step 618, the method 600 creates a trouble ticket. In one embodiment, the trouble ticket may be sent to the work center 190 for resolution. The method 600 then proceeds to step 620 where the method 600 ends.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 6 that recite a determining operation, or involve a decision, do not necessarily require that both branches of the determining operation be practiced. In other words, one of the branches of the determining operation can be deemed as an optional step.

Figure 8:
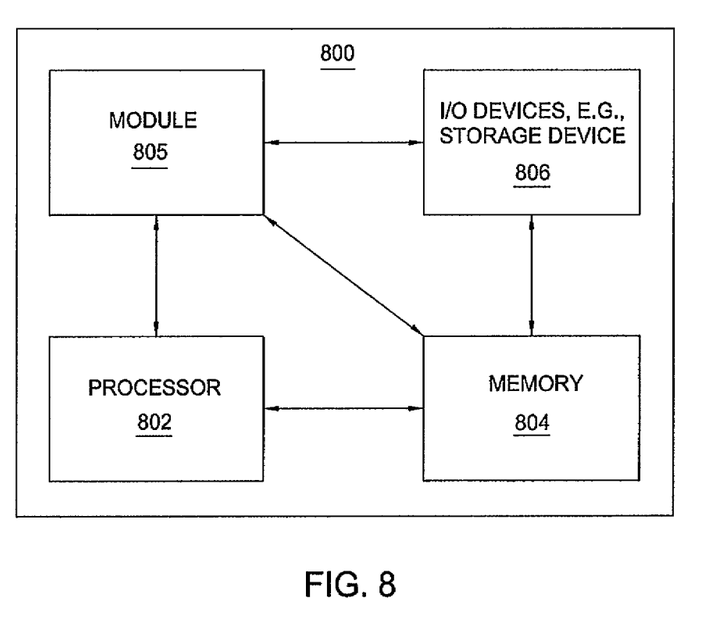
FIG. 8 illustrates a high-level block diagram of a general-purpose computer suitable for use in performing the functions described herein.

FIG. 8 depicts a high-level block diagram of a general-purpose computer suitable for use in performing the functions described herein. As depicted in FIGS. 6 and 7, the system 800 comprises a processor element 802 (e.g., a CPU), a memory 804, e.g., random access memory (RAM) and/or read only memory (ROM), a module 805 for performing mapping management, and various input/output devices 806 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 805 for performing mapping management can be loaded into memory 804 and executed by processor 802 to implement the functions as discussed above. As such, the present method 805 for performing mapping management (including associated data structures) of the present disclosure can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
monitoring, by a processor, network performance measurements of long term evolution mobility elements to determine a quality control indicator of each of a plurality of long term evolution interfaces of the long term evolution mobility elements and to determine key performance indicators for the long term evolution mobility elements;
monitoring, by the processor, a class type and a bandwidth type of each of the long term evolution interfaces to determine a class of service of each of the long term evolution interfaces;
detecting, by the processor, an impairment state based upon the key performance indicators;
determining, by the processor, that the impairment state is due to a class of service and a quality of service mismatch when determining a quality control indicator of one of the long term evolution interfaces does not match a required quality of service for the class of service of the one long term evolution interface, wherein the required quality of service for the class of service is determined from a predefined table for mobility signaling traffic that maps the class of service to the required quality of service, wherein the class of service is a function of: a retainability measure, and an availability measure of a network; and
reconfiguring, by the processor, the quality of service of the one long term evolution interface when the impairment state is due to the class of service and the quality of service mismatch.

2. The method of claim 1, further comprising:
creating a trouble ticket when the impairment state is not due to the class of service and the quality of service mismatch.

3. The method of claim 1, further comprising:
determining if the reconfiguring resolved the impairment state.

4. The method of claim 3, further comprising:
creating a trouble ticket when the reconfiguring did not resolve the impairment state.

5. The method of claim 3, further comprising:
continuing to monitor the network performance measurements and to monitor the class types and the bandwidth types of the long term evolution interfaces when the reconfiguring did resolve the impairment state.

6. The method of claim 1, wherein each of the quality control indicators is a function of a packet delay measurement and a packet error loss rate measurement.

7. The method of claim 1, wherein each class of service is further a function of at least one of: an integrity measure, and a utilization measure.

8. The method of claim 1, wherein the quality control indicator comprises a quality of service class identifier.

9. A non-transitory computer-readable medium storing a plurality of instructions which, when executed by a processor, cause the processor to perform operations, the operations comprising:
monitoring network performance measurements of long term evolution mobility elements to determine a quality control indicator of each of a plurality of long term evolution interfaces of the long term evolution mobility elements and to determine key performance indicators for the long term evolution mobility elements;
monitoring a class type and a bandwidth type of each of the long term evolution interfaces to determine a class of service of each of the long term evolution interfaces;
detecting an impairment state key performance indicators;
determining that the impairment state is due to a class of service and a quality of service mismatch when determining a quality control indicator of one of the long term evolution interfaces does not match a required quality of service for the class of service of the one long term evolution interface, wherein the required quality of service for the class of service is determined from a predefined table for mobility signaling traffic that maps the class of service to the required quality of service, wherein the class of service is a function of: a retainability measure, and an availability measure of a network; and
reconfiguring the quality of service of the one long term evolution interface when the impairment state is due to the class of service and the quality of service mismatch.

10. The non-transitory computer-readable medium of claim 9, wherein the operations further comprise:
creating a trouble ticket when the impairment state is not due to the class of service and the quality of service mismatch.

11. The non-transitory computer-readable medium of claim 9, wherein the operations further comprise:
determining if the reconfiguring resolved the impairment state.

12. The non-transitory computer-readable medium of claim 11, wherein the operations further comprise:
creating a trouble ticket when the reconfiguring did not resolve the impairment state.

13. The non-transitory computer-readable medium of claim 11, wherein the operations further comprise:

continuing to monitor the network performance measurements and to monitor the class types and the bandwidth types of the long term evolution interfaces when the reconfiguring did resolve the impairment state.

14. The non-transitory computer-readable medium of claim 9, wherein each of the quality control indicators is a function of a packet delay measurement and a packet error loss rate measurement.

15. The non-transitory computer-readable medium of claim 9, wherein each class of service is further a function of at least one of: an integrity measure, and a utilization measure.

16. The non-transitory computer-readable medium of claim 9, wherein the quality control indicator comprises a quality of service class identifier.

17. An apparatus, comprising:
   a processor; and
   a computer-readable medium storing instructions which, when executed by the processor, cause the processor to perform operations, the operations comprising:
      monitoring network performance measurements of long term evolution mobility elements to determine a quality control indicator of each of a plurality of long term evolution interfaces of the long term evolution mobility elements and to determine key performance indicators for the long term evolution mobility elements;
      monitoring a class type and a bandwidth type of each of the long term evolution interfaces to determine a class of service of each of the long term evolution interfaces;
      detecting an impairment state based upon the key performance indicators;
      determining that the impairment state is due to a class of service and a quality of service mismatch when determining a quality control indicator of one of the long term evolution interfaces does not match a required quality of service for the class of service of the one long term evolution interface, wherein the required quality of service for the class of service is determined from a predefined table for mobility signaling traffic that maps the class of service to the required quality of service, wherein the class of service is a function of: a retainability measure, and an availability measure of a network; and
      reconfiguring the quality of service of the one long term evolution interface when the impairment state is due to the class of service and the quality of service mismatch.

18. The apparatus of claim 17, wherein the operations further comprise:
   creating a trouble ticket when the impairment state is not due to the class of service and the quality of service mismatch.

19. The apparatus of claim 17, wherein the quality control indicator comprises a quality of service class identifier.

* * * * *